(12) United States Patent
Lim et al.

(10) Patent No.: US 12,272,864 B2
(45) Date of Patent: Apr. 8, 2025

(54) ELECTRONIC DEVICE INCLUDING ANTENNA

(71) Applicant: SAMSUNG ELECTRONICS CO., LTD., Suwon-si (KR)

(72) Inventors: Youngkon Lim, Suwon-si (KR); Wonkyu Kim, Suwon-si (KR); Kihyuk Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 17/850,381

(22) Filed: Jun. 27, 2022

(65) Prior Publication Data

US 2022/0399635 A1    Dec. 15, 2022

Related U.S. Application Data

(63) Continuation of application No. PCT/KR2022/008351, filed on Jun. 14, 2022.

(30) Foreign Application Priority Data

Jun. 15, 2021    (KR) .................. 10-2021-0077580

(51) Int. Cl.
*H01Q 1/24*    (2006.01)
*H04M 1/02*    (2006.01)

(52) U.S. Cl.
CPC ............ *H01Q 1/243* (2013.01); *H04M 1/026* (2013.01)

(58) Field of Classification Search
None
See application file for complete search history.

(56) References Cited

U.S. PATENT DOCUMENTS

| 5,655,665 | A | 8/1997 | Allen et al. |
| 9,722,673 | B2 | 8/2017 | Yang et al. |
| 10,511,095 | B2 | 12/2019 | Lee et al. |
| 2009/0251268 | A1* | 10/2009 | Sato ............... C04B 35/265 336/200 |
| 2013/0181805 | A1 | 7/2013 | Saito et al. |

(Continued)

FOREIGN PATENT DOCUMENTS

| JP | 2017-220850 | 12/2017 |
| KR | 10-2013-0005720 | 1/2013 |

(Continued)

OTHER PUBLICATIONS

Search Report and Written Opinion dated Sep. 16, 2022 issued in International Patent Application No. PCT/KR2022/008351.

*Primary Examiner* — Frantz Bataille
(74) *Attorney, Agent, or Firm* — Nixon & Vanderhye P.C.

(57) ABSTRACT

An electronic device may include a memory; a processor; communication circuitry; and an antenna. The antenna may include an insulation sheet; an antenna pattern disposed in the insulation sheet and having a meander form; a first magnetic sheet layer disposed on a first surface of the insulation sheet; and a second magnetic sheet layer disposed on a second surface of the insulation sheet. Each of the first magnetic sheet layer and the second magnetic sheet layer may include a plurality of magnetic sheets disposed at specified intervals each having a first area. The plurality of magnetic sheets of the first magnetic sheet layer may be disposed to correspond to the first areas of the second magnetic sheet layer.

20 Claims, 11 Drawing Sheets

(56) References Cited

U.S. PATENT DOCUMENTS

| | | |
|---|---|---|
| 2016/0141909 A1 | 5/2016 | Lee et al. |
| 2018/0069312 A1* | 3/2018 | Lee .................... H01Q 7/06 |
| 2018/0181805 A1 | 6/2018 | Asl |
| 2020/0328627 A1 | 10/2020 | Stingu et al. |
| 2021/0066807 A1 | 3/2021 | Lee et al. |

FOREIGN PATENT DOCUMENTS

| | | |
|---|---|---|
| KR | 10-2015-0001417 | 1/2015 |
| KR | 10-2018-0047889 | 5/2018 |
| KR | 10-1927955 | 12/2018 |
| KR | 10-2020-0120133 | 10/2020 |
| KR | 10-2021-0028001 | 3/2021 |
| WO | 2016/038759 | 3/2016 |

* cited by examiner

12,272,864 B2

ELECTRONIC DEVICE INCLUDING ANTENNA

CROSS-REFERENCE TO RELATED APPLICATIONS

This application is a continuation of International Application No. PCT/KR2022/008351 designating the United States, filed on Jun. 14, 2022, in the Korean Intellectual Property Receiving Office and claiming priority to Korean Patent Application No. 10-2021-0077580, filed on Jun. 15, 2021, in the Korean Intellectual Property Office, the disclosures of which are incorporated by reference herein in their entireties.

BACKGROUND

Field

The disclosure relates to an electronic device including an antenna.

Description of Related Art

Recently, an electronic device may support various types of wireless communication methods, and may representatively support a short-distance wireless communication technology. The electronic device may separately include antennas in order to support various types of wireless communications, or may include an antenna capable of integratedly supporting different types of wireless communications.

An electronic device may include an antenna having a solenoid type including a loop pattern having two or more turns. The antenna having a solenoid type including a loop pattern having two or more turns may be formed as a structure that surrounds a high permeability sheet using two layer patterns in order to form the antenna in a plane form. In this case, a manufacturing process of the antenna may become complicated and the unit cost of production may rise because the two layer patterns need to be used and the high permeability sheet needs to be inserted between the two layer patterns.

SUMMARY

Embodiments of the disclosure provide an electronic device including an antenna that may support various wireless communications using a single layer pattern.

An electronic device according to various example embodiments of the disclosure may include: a memory; a processor; communication circuitry; and an antenna. The antenna may include: an insulation sheet; an antenna pattern disposed in the insulation sheet and having a meander form; a first magnetic sheet layer disposed on a first surface of the insulation sheet; and a second magnetic sheet layer disposed on a second surface of the insulation sheet. Each of the first magnetic sheet layer and the second magnetic sheet layer may include a plurality of magnetic sheets disposed at specified intervals each having a first area. The plurality of magnetic sheets of the first magnetic sheet layer may be disposed to correspond to the first areas of the second magnetic sheet layer.

An electronic device according to various example embodiments of the disclosure may include: a memory; a processor; communication circuitry; and an antenna. The antenna may include: an insulation sheet comprising an opening part; an antenna pattern disposed on the insulation sheet and having a meander form; a first magnetic sheet layer disposed on a first surface of the insulation sheet; and a second magnetic sheet layer disposed on a second surface of the insulation sheet. The first magnetic sheet layer and the second magnetic sheet layer may be connected through the opening part.

According to various example embodiments of the disclosure, the electronic device can reduce an antenna manufacturing cost by including the antenna using a single layer pattern.

The electronic device including an antenna according to various example embodiments of the disclosure can facilitate an antenna assembly structure by supporting various wireless communications using a single layer pattern.

BRIEF DESCRIPTION OF THE DRAWINGS

In relation to the description of the drawings, the same or similar reference numerals may be used with respect to the same or similar elements. Further, the above and other aspects, features and advantages of certain embodiments of the present disclosure will be more apparent from the following detailed description, taken in conjunction with the accompanying drawings, in which.

DETAILED DESCRIPTION

Figure 1:
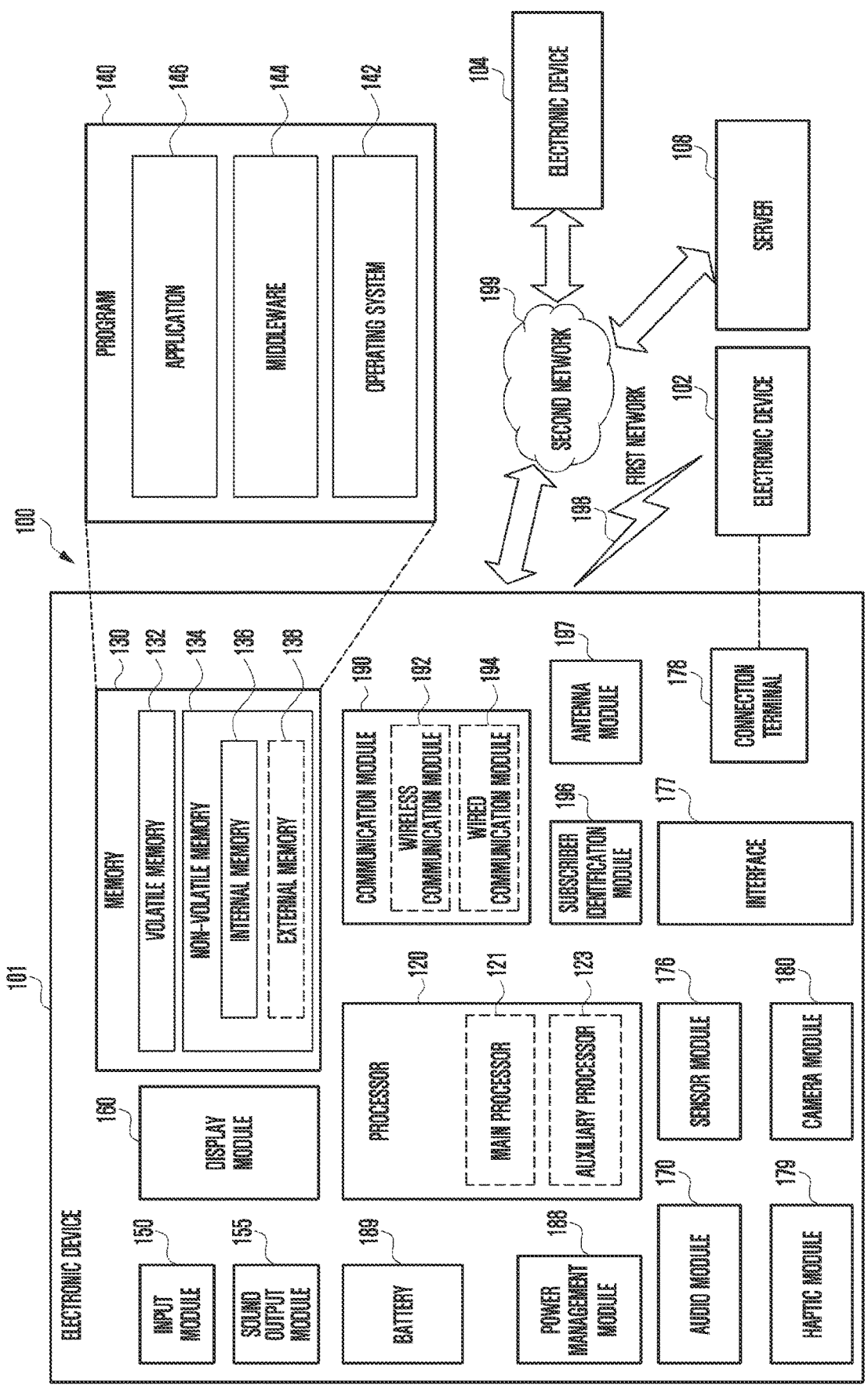
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
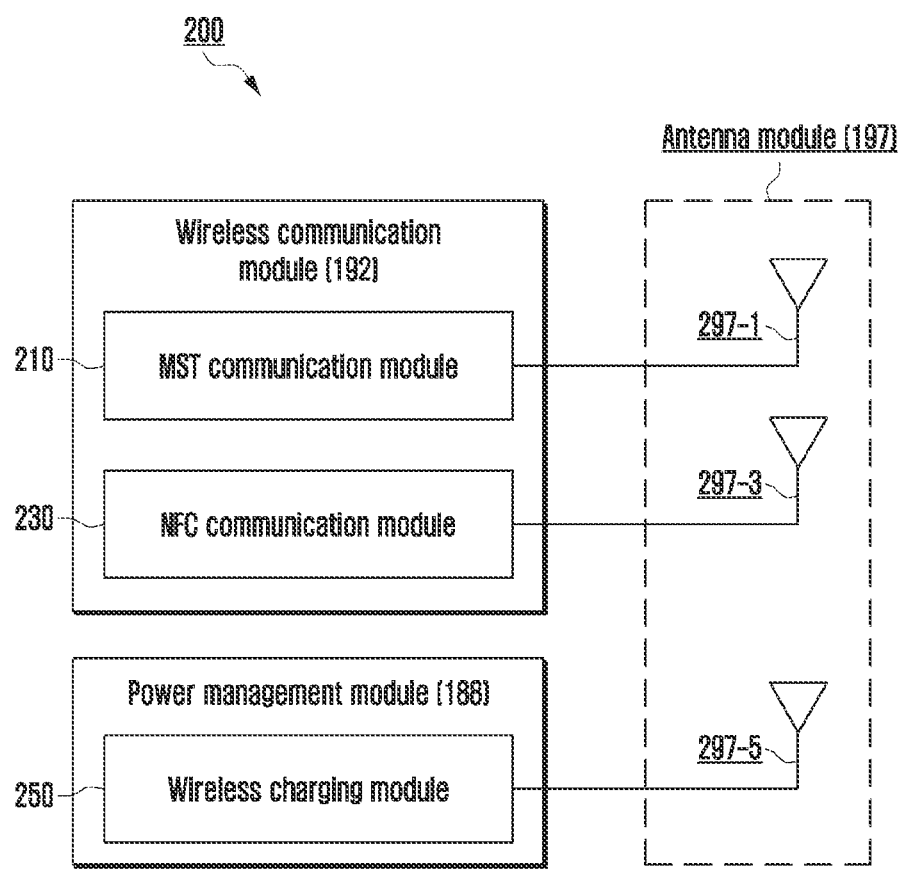
FIG. 2 is a block diagram illustrating an example configuration of a wireless communication module, power management module, and antenna module of an electronic device according to various embodiments.

FIG. 2 is a block diagram 200 illustrating an example configuration of the wireless communication module 192, power management module 188, and antenna module 197 of the electronic device 101 according to various embodiments. With reference to FIG. 2, the wireless communication module 192 may include an MST communication module (e.g., including MST circuitry) 210 and/or an NFC communication module (e.g., including NFC circuitry) 230, and the power management module 188 may include a wireless charging module (e.g., including wireless charging circuitry) 250. In such a case, the antenna module 297 may include a plurality of antennas, including an MST antenna 297-1 connected to the MST communication module 210, an NFC antenna 297-3 connected to the NFC communication module 230 and/or a wireless charging antenna 297-5 connected to the wireless charging module 250. For convenience of description, elements redundant with those in FIG. 1 may be omitted or briefly described.

The MST communication module 210 may include various MST communication circuitry and receive a signal including control information or payment information, such as card information, from the processor 120, may generate a magnetic signal corresponding to the received signal through the MST antenna 297-1, and may then transmit the generated magnetic signal to the external electronic device 102 (e.g., a POS device). In order to generate the magnetic signal, according to an embodiment, the MST communication module 210 may include a switching module including one or more switches connected to the MST antenna 297-1 (not illustrated), and may change the direction of a voltage or current supplied to the MST antenna 297-1 based on the received signal by controlling the switching module. A change in the direction of the voltage or current may enable the direction of the magnetic signal (e.g., the magnetic field), transmitted through the MST antenna 297-1, to be changed. When the magnetic signal having the state in which the direction of the magnetic signal is changed is detected in the external electronic device 102, an effect (e.g., a waveform) similar to a magnetic field generated as a magnetic card corresponding to the received signal (e.g., card information) is swiped by the card reader of the electronic device 102 may be caused. According to an embodiment, payment-related information and a control signal received in the form of a magnetic signal by the electronic device 102 may be transmitted to the external server 108 (e.g., a payment server) over the network 199, for example.

The NFC communication module 230 may include various NFC communication circuitry and obtain a signal including control information or payment information, such as card information, from the processor 120, and may transmit the obtained signal to the external electronic device 102 through the NFC antenna 297-3. According to an embodiment, the NFC communication module 230 may receive such a signal from the external electronic device 102 through the NFC antenna 297-3.

The wireless charging module 250 may include various wireless charging circuitry and wirelessly transmit power to the external electronic device 102 (e.g., a mobile phone or a wearable device) or wirelessly receive power from the external electronic device 102 (e.g., a wireless charging device) through the wireless charging antenna 297-5. The wireless charging module 250 may support one or more of various wireless charging methods including a magnetic resonance method or a magnetic induction method, for example.

According to an embodiment, some antennas of the MST antenna 297-1, the NFC antenna 297-3, or the wireless charging antenna 297-5 may share at least some of radiation parts. For example, the radiation part of the MST antenna 297-1 may be used as the radiation part of the NFC antenna 297-3 or the wireless charging antenna 297-5, and vice versa. In such a case, the antenna module 297 may include a switching circuit (not illustrated) configured to selectively connect (e.g., close) or separate (e.g., open) at least some of the antennas 297-1, 297-3, or 297-3) under the control of the wireless communication module 192 (e.g., the MST communication module 210 or the NFC communication module 230) or the power management module 188 (e.g., the wireless charging module 250). For example, if the electronic device 101 uses a wireless charging function, the NFC communication module 230 or the wireless charging module 250 may temporarily separate at least some area of a radiation part, shared by the NFC antenna 297-3 and the wireless charging antenna 297-5, from the NFC antenna 297-3 and connect the radiation part to the wireless charging antenna 297-5 by controlling the switching circuit.

According to an embodiment, at least one function of the MST communication module 210, the NFC communication module 230, or the wireless charging module 250 may be controlled by an external processor (e.g., the processor 120). According to an embodiment, designated functions (e.g., payment functions) of the MST communication module 210 or the NFC communication module 230 may be performed in a trusted execution environment (TEE). The TEE according to various embodiments may form an execution environment to which at least some designated area of the memory 130 is assigned in order for the TEE to be used to perform a function (e.g., a function related to financial transactions or personal information) that requires security having a relatively high level, for example. In such a case, access to the designated area may be limitedly permitted by classifying the area depending on a subject that accesses the area or an application executed in the TEE, for example.

Figure 3:
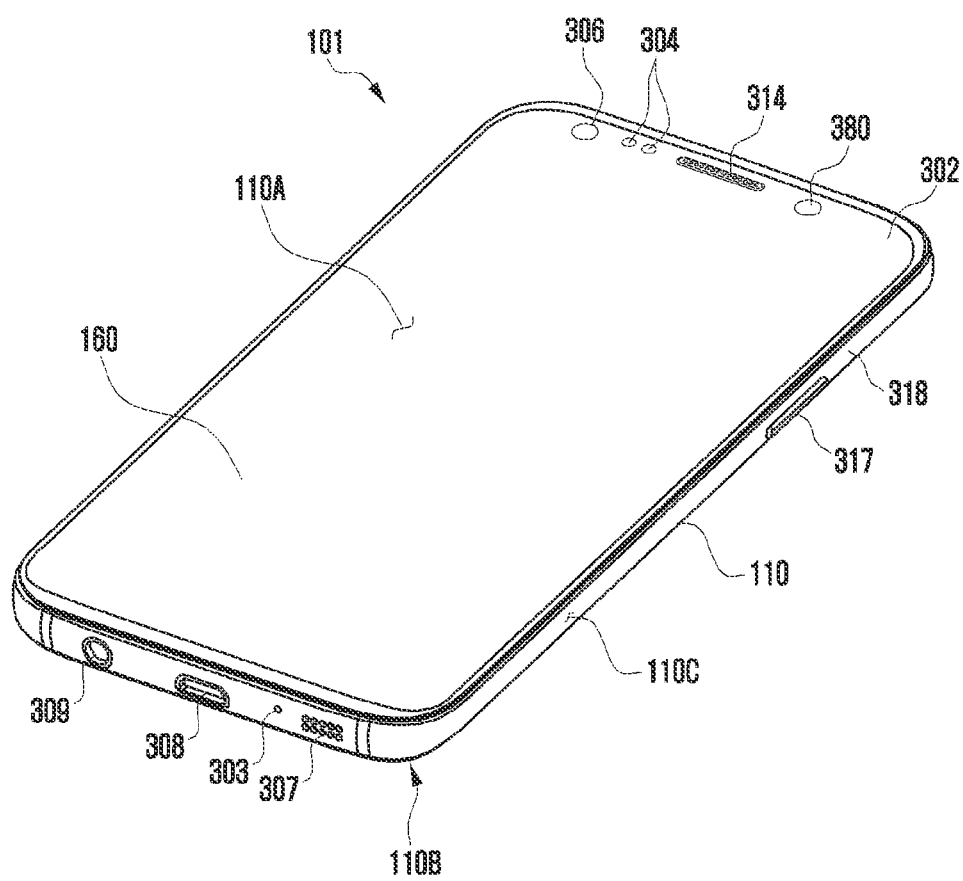
FIG. 3 is a front perspective view of the electronic device according to various embodiments.

FIG. 3 is a front perspective view of the electronic device 101 according to various embodiments.

The electronic device 101 according to an embodiment may include a housing 110, including a first plate (or a front surface) 110A, a second plate (or a back surface) 110B, and a side surface 110C surrounding a space between the first plate 110A and the second plate 110B. In an embodiment (not illustrated), the housing may denote a structure that forms some of the first plate 110A, the second plate 110B, and the side surface 110C in FIG. 1. According to an embodiment, the first plate 110A may be formed by a front surface plate 302 (e.g., a glass plate or a polymer plate including various coating layers) at least a part of which is substantially transparent. The second plate 110B may be formed by a back surface plate (not illustrated) that is substantially opaque. The back surface plate (not illustrated) may be formed by coated or colored glass, ceramic, a polymer, metal (e.g., aluminum, stainless steel (STS), or magnesium), or a combination of at least two of the materials, for example. The side surface 110C may combine the front surface plate 302 and the back surface plate (not illustrated), and may be formed by a side surface bezel structure (or a "side surface member") 318 including metal and/or a polymer. In some embodiment, the back surface plate (not illustrated) and the side surface bezel structure 318 may be integratedly formed, and may include the same material (e.g., a metal material such as aluminum).

According to an embodiment, the electronic device 101 may include one or more of the display module 160, an audio module 303, 307, and 314, a sensor module 304, the camera module 180, a key input device 317, an indicator 306, and a connector hole 308 and 309. In some embodiment, the electronic device 101 may omit at least one (e.g., the key input device 317 or the indicator 306) of the constituent elements or may additionally include another constituent element.

The display module 160 may be visible through a substantial portion of the front surface plate 302, for example. The display module 160 may be combined with a touch sensing circuit, a pressure sensor capable of measuring pressure of a touch and/or a digitizer for detecting a stylus pen using a magnetic field method or may be disposed in a way to be adjacent thereto.

The audio module 303, 307, and 314 may include a microphone hole 303 and a speaker hole 307 and 314. The microphone hole 303 may have a microphone for obtaining an external sound disposed therein. In some embodiment, the microphone hole 303 may have a plurality of microphones disposed therein so that a direction of a sound can be detected. The speaker hole 307 and 314 may include an external speaker hole 307 and a receiver hole 314 for a call. In some embodiment, the speaker hole 307 and 314 and the microphone hole 303 may be implemented as one hole or a speaker may be included without the speaker hole 307 and 314 (e.g., a piezo speaker).

The sensor module 304 may generate an electrical signal or a data value corresponding to an internal operating state of the electronic device 101 or an external environment state. The sensor module 304 may include a first sensor module 104 (e.g., a proximity sensor) disposed in the first plate 110A of the housing 110 and/or a second sensor module (not illustrated) (e.g., a fingerprint sensor) and/or a third sensor module (not illustrated) (e.g., an HRM sensor) disposed in the second plate 110B of the housing 110, for example. The fingerprint sensor may be disposed in the second surface 110B as well as the first surface 110A (e.g., a home key button (not illustrated)) of the housing 110. The electronic device 101 may further include at least one of sensor modules not illustrated, for example, a gesture sensor, a gyro sensor, an atmospheric sensor, a magnetic sensor, an acceleration sensor, a grip sensor, a color sensor, an infrared (IR) sensor, a bio sensor, a temperature sensor, a humidity sensor, or an illuminance sensor 104.

The camera module 180 may include a first camera device 380 disposed on the first plate 110A of the electronic device 101 and a second camera device (not illustrated) and/or a flash (not illustrated) disposed on the second plate 110B. The camera module 180, such as the first camera device 380 and the second camera device (not illustrated), may include one or a plurality of lenses, image sensors and/or image signal processors. The flash (not illustrated) may include a light-emitting diode or a xenon lamp, for example. In some embodiments, two or more lenses (wide-angle and telephoto lenses) and image sensors may be disposed on one surface of the electronic device 101.

The first plate 110A of the housing 110 may further include a home key button (not illustrated). The first plate 110A of the housing 110 may further include a touch pad (not illustrated) disposed around the home key button (not illustrated). The side surface 110C of the housing 110 may include a side key button 117. In other embodiments, the electronic device 101 may not include some or all of the aforementioned key input devices 317. A key input device 317 that is not included in the electronic device 101 may be implemented in another form, such as a soft key, on the display module 160.

The indicator 306 may be disposed on the first plate 110A of the housing 110, for example. The indicator 306 may provide state information of the electronic device 101 in a light form, for example, and may include an LED.

The connector hole 308 and 309 may include a first connector hole 308 capable of accommodating a connector (e.g., a USB connector) for transmitting and receiving power and/or data to and from an external electronic device and/or a second connector hole (e.g., an earphone jack) 309 capable of accommodating a connector for transmitting and receiving audio signals to and from an external electronic device. In various embodiments, the second connector hole (e.g., the earphone jack) 309 may be omitted.

Figure 4:
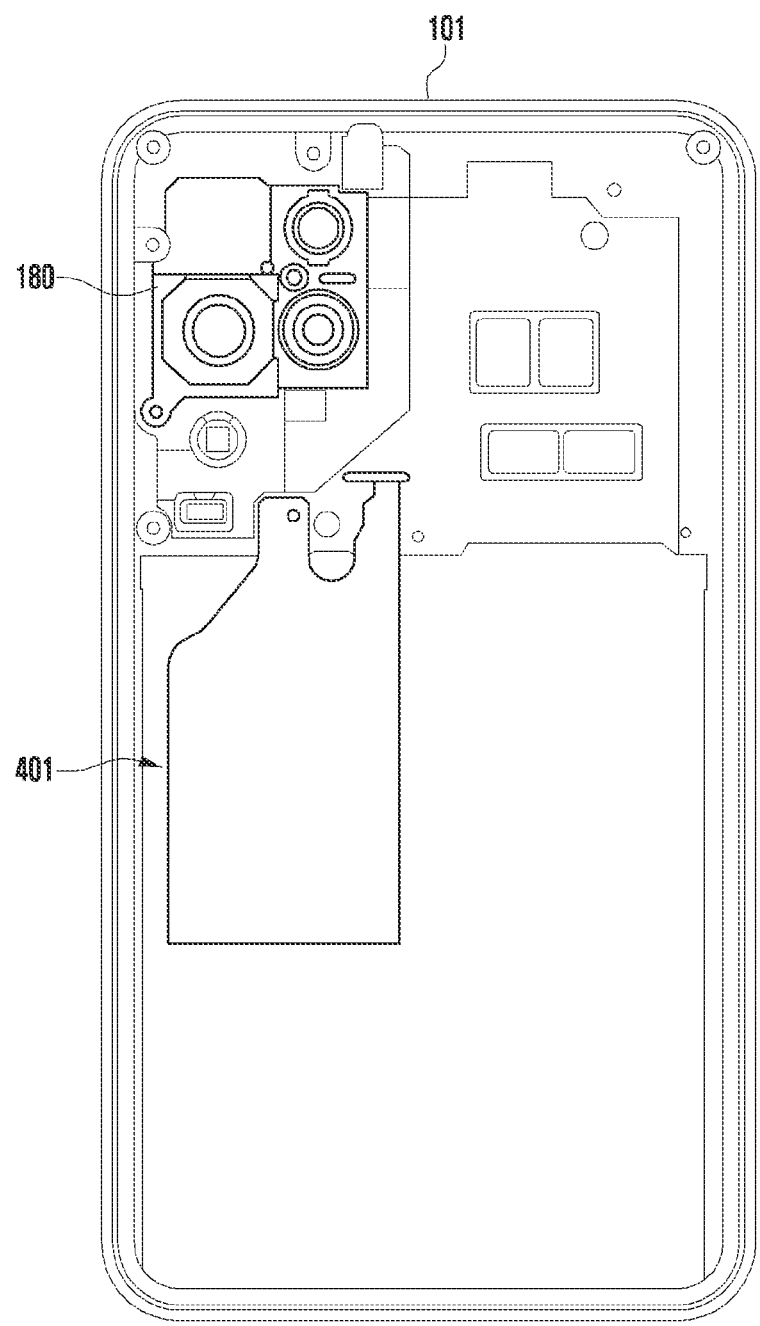
FIG. 4 is a diagram illustrating the electronic device of FIG. 3 viewed by removing a second plate in the electronic device according to various embodiments.

FIG. 4 is a diagram illustrating the electronic device of FIG. 3 viewed by removing the second plate 110B according to various embodiments.

The electronic device 101 may include the camera module 180 and an antenna 401. The antenna 401 may be disposed in at least a part of the electronic device 101 toward the second plate 110B.

The antenna 401 may be an antenna including a single layer pattern. In an embodiment, the antenna 401 may support communication frequency bands using various wireless communication modules. In various embodiments, the antenna 401 may support at least one short-distance wireless communication frequency band. The antenna 401 may support frequency bands using magnetic secure transmission (MST) communication and/or near field communication (NFC) communication.

Figure 5:
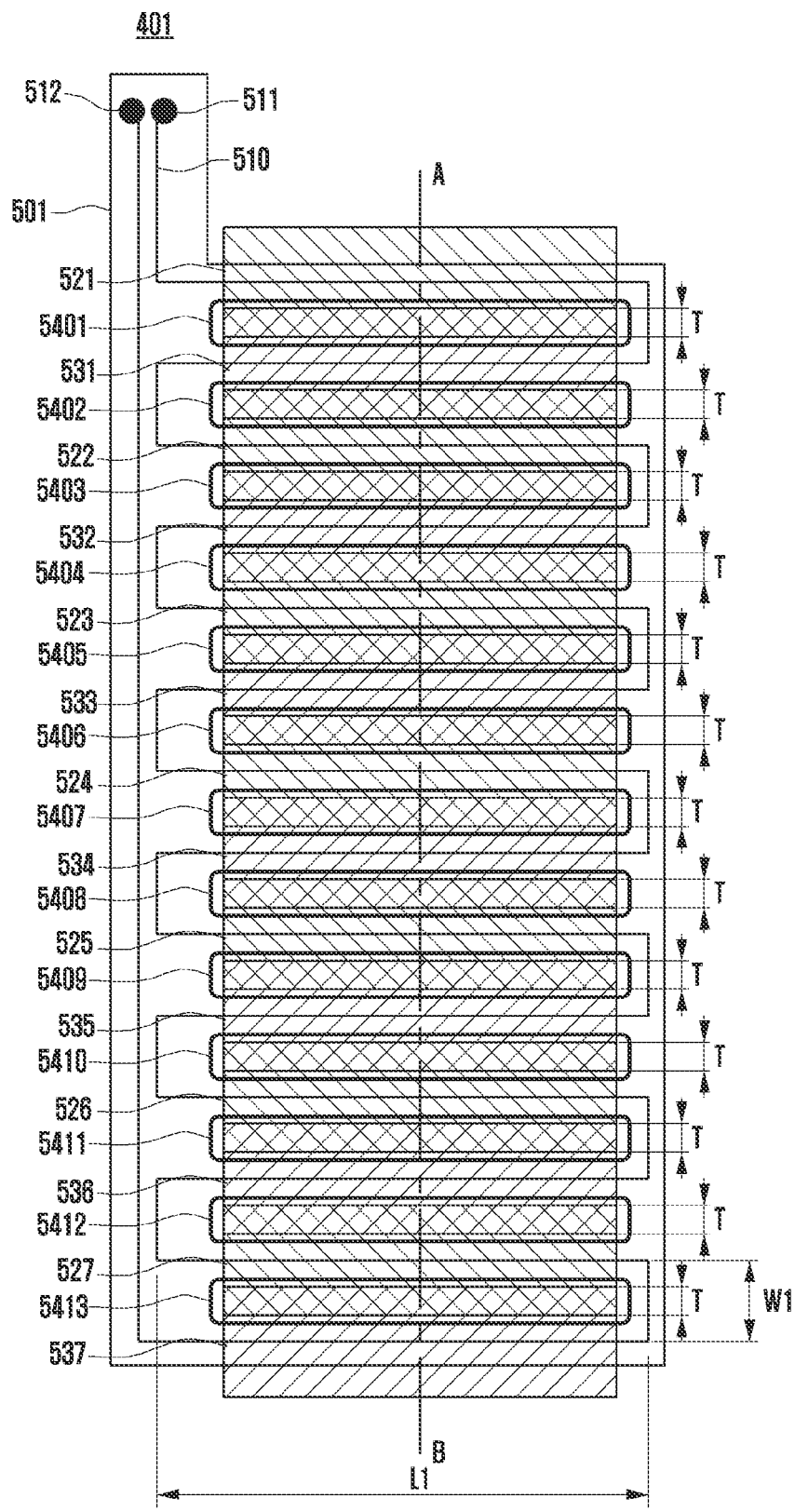
FIG. 5 is a diagram illustrating an antenna according to various embodiments.

FIG. 5 is a diagram illustrating an example antenna 401 according to various embodiments.

Figure 6:
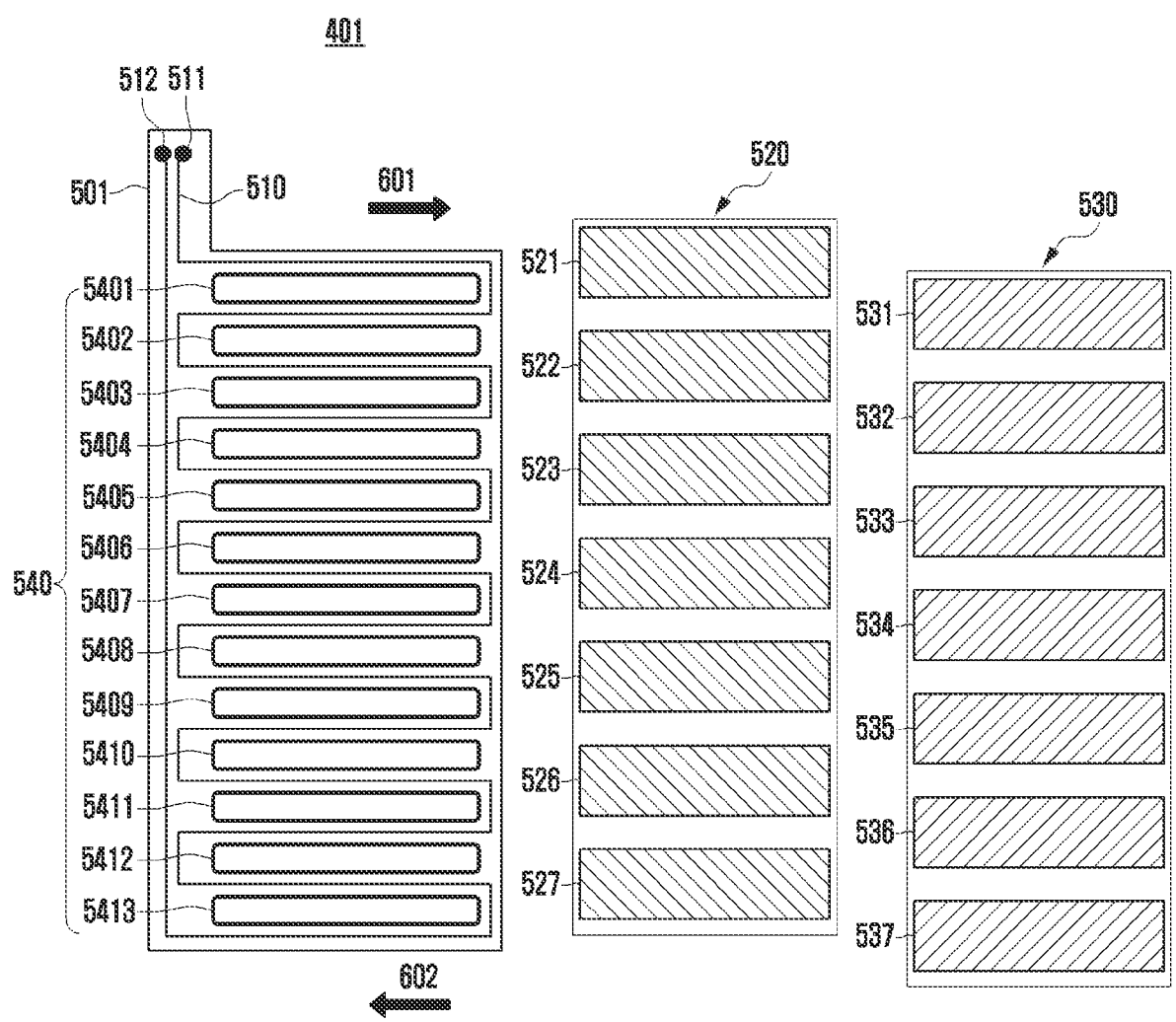
FIG. 6 is an exploded view of the antenna according to various embodiments.

FIG. 6 is an exploded view of the antenna 401 according to various embodiments.

Figure 7:
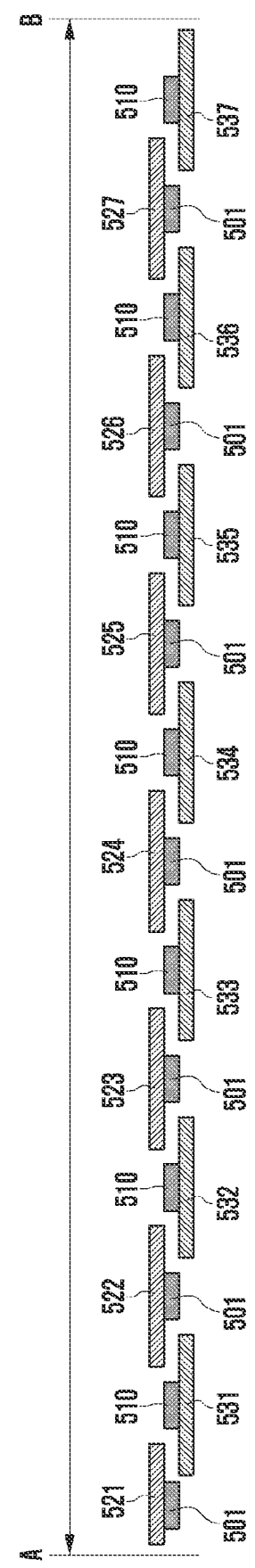
FIG. 7 is a cross-sectional view of the antenna in FIG. 4, which is taken in a direction A-B according to various embodiments.

FIG. 7 is a cross-sectional view of the antenna 401 in FIG. 4, which is taken in a direction A-B according to various embodiments.

With reference to FIGS. 5 and 6, the antenna 401 may include an insulation sheet 501, an antenna pattern 510, a first magnetic sheet layer 520, and a second magnetic sheet layer 530.

The insulation sheet 501 may include an antenna pattern 510. In various embodiments, the antenna pattern 510 may include a first terminal part 511 and a second terminal part 512, and may have a zigzag pattern. The antenna pattern 510 may include the first terminal part 511 and the second terminal part 512, and may have a meander line pattern.

The first terminal part 511 and/or the second terminal part 512 may connect the antenna pattern 510 to an external device. For example, the wireless communication module 192 or the power management module 188 may be electrically connected to the antenna 401 through the first terminal part 511 and/or the second terminal part 512. The insulation sheet 501 may be a flexible printed circuit board (FPCB), for example.

The first terminal part 511 may be connected to one end of the antenna pattern 510. The second terminal part 512 may be connected to the other end of the antenna pattern 510.

The antenna pattern 510 may be a meander line having a determined length L1 and a determined width W1. The number of times of bending of the meander line of the antenna pattern 510 may have the determined number of times of bending. For example, the length L1, width W1, or number of times of bending of the antenna pattern 510 may be determined based on a frequency band supported by the antenna 401.

In various embodiments, the determined length L1, determined width W1 and/or number of times of bending of the antenna pattern 510 may be changed by the design.

An opening part 540 may include a plurality of openings 5401, 5402, 5403, 5404, 5405, 5406, 5407, 5408, 5409, 5410, 5411, 5412, and 5413. The plurality of openings 5401, 5402, 5403, 5404, 5405, 5406, 5407, 5408, 5409, 5410, 5411, 5412, and 5413 included in the opening part 540 may correspond to the number of times of bending of the antenna pattern 510. In an embodiment, the opening part 540 may be a penetration hole of the insulation sheet 501. The opening part 540 may correspond to a shape of the determined length L1 and determined width W1 of the antenna pattern.

In various embodiments, at least some of the plurality of openings 5401, 5402, 5403, 5404, 5405, 5406, 5407, 5408, 5409, 5410, 5411, 5412, and 5413 may be omitted or all of them may be omitted by the design. The insulation sheet 501 may not include at least some of the plurality of openings 5401, 5402, 5403, 5404, 5405, 5406, 5407, 5408, 5409, 5410, 5411, 5412, and 5413 or may not include all of the plurality of openings 5401, 5402, 5403, 5404, 5405, 5406, 5407, 5408, 5409, 5410, 5411, 5412, and 5413.

The insulation sheet 501 may include the opening part 540 corresponding to a shape of the determined length L1 and determined width W1 of the antenna pattern 510 and having a size smaller than the determined length L1 and the determined width W1.

In various embodiments, the insulation sheet 501 may include the plurality of openings 5401, 5402, 5403, 5404, 5405, 5406, 5407, 5408, 5409, 5410, 5411, 5412, and 5413 corresponding to a shape of the determined length L1 and determined width W1 of the antenna pattern 510 and having a size smaller than the determined length L1 and the determined width W1.

In various embodiments, the insulation sheet 501 may include the opening part 540 having a size corresponding to the determined length L1 and determined width W1 of the antenna pattern 510.

In various embodiments, the insulation sheet 501 may include the plurality of openings 5401, 5402, 5403, 5404, 5405, 5406, 5407, 5408, 5409, 5410, 5411, 5412, and 5413 having a size corresponding to the determined length L1 and determined width W1 of the antenna pattern 510.

In various embodiments, the opening part 540 included in the insulation sheet 501 may be omitted. The insulation sheet 501 may not include the opening part 540. The opening part 540 may form an airgap of the antenna pattern 510.

In various embodiments, the first magnetic sheet layer 520 may be disposed on a first surface of the insulation sheet 501. The second magnetic sheet layer 530 may be disposed on a second surface of the insulation sheet 501. The first magnetic sheet layer 520 and the second magnetic sheet layer 530 may have high permeability. For example, a plurality of first magnetic sheets 521, 522, 523, 524, 525, 526, and 527 and a plurality of second magnetic sheets 531, 532, 533, 534, 535, 536, and 537 may be ferrite sheets. In an embodiment, the first magnetic sheet layer 520 and the second magnetic sheet layer 530 may have different permeability. In various embodiments, the first magnetic sheet layer 520 and the second magnetic sheet layer 530 may have substantially the same permeability.

In various embodiments, the first magnetic sheet layer 520 may include the plurality of first magnetic sheets 521, 522, 523, 524, 525, 526, and 527 or a connection member. The plurality of first magnetic sheets 521, 522, 523, 524, 525, 526, and 527 may be spaced apart from each other. In an embodiment, the plurality of first magnetic sheets 521, 522, 523, 524, 525, 526, and 527 may be spaced apart from each other, and may form the first magnetic sheet layer 520 by being connected by the connection members interposed therebetween. The connection member may not include magnetism. For example, the connection member may be a material having low permeability, such as an insulating member. In various embodiments, the plurality of first magnetic sheets 521, 522, 523, 524, 525, 526, and 527 may be spaced apart from each other at determined intervals.

In various embodiments, the second magnetic sheet layer 530 may include the plurality of second magnetic sheets 531, 532, 533, 534, 535, 536, and 537 or a connection member. The plurality of second magnetic sheets 531, 532, 533, 534, 535, 536, and 537 may be spaced apart from each other. In an embodiment, the plurality of second magnetic sheets 531, 532, 533, 534, 535, 536, and 537 may be isolated from each other, and may form the second magnetic sheet layer 530 by being connected by the connection members interposed therebetween. The connection member may not include magnetism. The connection member may be a material having low permeability, such as an insulating member. The connection member may have lower permeability than the plurality of first magnetic sheets 521, 522, 523, 524, 525, 526, and 527 and the plurality of second magnetic sheets 531, 532, 533, 534, 535, 536, and 537. In various embodiments, the plurality of second magnetic sheets 531, 532, 533, 534, 535, 536, and 537 may be spaced apart from each other at determined intervals.

The number of plurality of first magnetic sheets 521, 522, 523, 524, 525, 526, and 527 included in the first magnetic sheet layer 520 may be different depending on the number of turns of the antenna pattern 510 having a meander form.

The number of plurality of second magnetic sheets 531, 532, 533, 534, 535, 536, and 537 included in the second magnetic sheet layer 530 may be different depending on the number of turns of the antenna pattern 510 having a meander form.

With reference to FIGS. 5 and 7, the first magnetic sheet layer 520 disposed on the first surface of the insulation sheet 501 and the second magnetic sheet layer 530 disposed on the second surface thereof may be disposed so that magnetic sheets thereof cross each other.

In various embodiments, the plurality of first magnetic sheets 521, 522, 523, 524, 525, 526, and 527 of the first magnetic sheet layer 520 and the plurality of second magnetic sheets 531, 532, 533, 534, 535, 536, and 537 of the second magnetic sheet layer 530 may be disposed at determined intervals each having a given area. The plurality of first magnetic sheets 521, 522, 523, 524, 525, 526, and 527 of the first magnetic sheet layer 520 may be disposed to correspond to given areas of the second magnetic sheet layer 530. The plurality of second magnetic sheets 531, 532, 533, 534, 535, 536, and 537 of the second magnetic sheet layer 530 may be disposed to correspond to given areas of the first magnetic sheet layer 520.

Magnetic sheet areas of the first magnetic sheet layer 520 disposed on the first surface of the insulation sheet 501 and the second magnetic sheet layer 530 disposed on the second surface thereof may be overlapped in at least some area of the magnetic sheet layers. The magnetic sheets of the first magnetic sheet layer 520 and the second magnetic sheet layer 530 may be overlapped by a determined interval T in at least some area of the magnetic sheet layers. For example, when viewed from the top of the first surface or the second surface, the (1-1)-th magnetic sheet 521 and the (1-2)-th magnetic sheet 522 may be overlapped with the (2-1)-th magnetic sheet 531. Furthermore, for example, when viewed from the top of the first surface or the second surface, the (1-2)-th magnetic sheet 522 and the (1-3)-th magnetic sheet 523 may be overlapped with the (2-2)-th magnetic sheet 532. Furthermore, for example, when viewed from the top of the first surface or the second surface, the (1-3)-th magnetic sheet 523 and the (1-4)-th magnetic sheet 524 may be overlapped with the (2-3)-th magnetic sheet 533. Furthermore, for example, when viewed from the top of the first surface or the second surface, the (1-4)-th magnetic sheet 524 and the (1-5)-th magnetic sheet 525 may be overlapped with the (2-4)-th magnetic sheet 534. Furthermore, for example, when viewed from the top of the first surface or the second surface, the (1-5)-th magnetic sheet 525 and the (1-6)-th magnetic sheet 526 may be overlapped with the (2-5)-th magnetic sheet 535. Furthermore, for example, when viewed from the top of the first surface or the second surface, the (1-6)-th magnetic sheet 526 and the (1-7)-th magnetic sheet 527 may be overlapped with the (2-6)-th magnetic sheet 536. Furthermore, for example, when viewed from the top of the first surface or the second surface, the (1-7)-th magnetic sheet 527 may be overlapped with the (2-7)-th magnetic sheet 537.

In various embodiments, a section in which the magnetic sheet areas are overlapped may correspond to the size of the opening part 540.

With reference to FIGS. 5, 6 and 7, the plurality of first magnetic sheets 521, 522, 523, 524, 525, 526, and 527 may be overlapped with at least a part of the antenna pattern 510 extended in a first direction 601 in the antenna pattern 510. For example, if an area in which the first terminal part 511 and/or the second terminal part 512 are disposed is the left, the first direction 601 may be a direction extended from the left to the right.

The antenna pattern 510 may include a part toward the first direction 601 and a part toward a second direction 602.

The plurality of second magnetic sheets 531, 532, 533, 534, 535, 536, and 537 may be overlapped with at least a part of the antenna pattern 510 extended in the second direction 602 in the antenna pattern 510. For example, if an area in which the first terminal part 511 and/or the second terminal part 512 are disposed is the left, the second direction 602 may be a direction extended from the right to the left.

In various embodiments, the plurality of first magnetic sheets 521, 522, 523, 524, 525, 526, and 527 may be disposed to overlap parts of the antenna pattern 510 extended in the second direction 602 in the antenna pattern 510. The plurality of second magnetic sheets 531, 532, 533, 534, 535, 536, and 537 may be disposed to overlap parts of the antenna pattern 510 extended in the first direction 601 in the antenna pattern 510.

In various embodiments, the plurality of first magnetic sheets 521, 522, 523, 524, 525, 526, and 527 and the plurality of second magnetic sheets 531, 532, 533, 534, 535, 536, and 537 may be closely attached to each other through the opening part 540.

Figure 8:
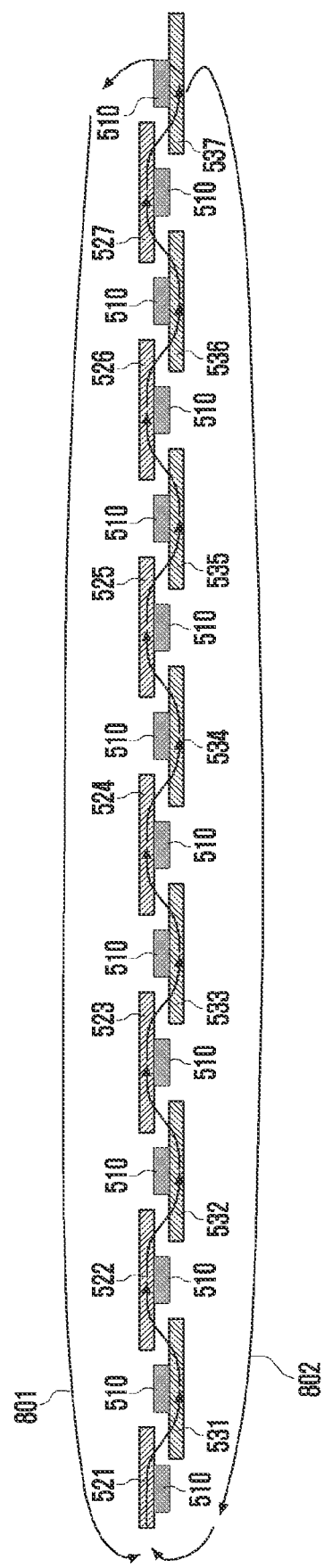
FIG. 8 is a diagram illustrating a magnetic field pattern of the antenna according to various embodiments.

FIG. 8 is a diagram illustrating an example magnetic field pattern of the antenna 401 according to various embodiments.

When the antenna pattern 510 is supplied with power from the electronic device 101 and a current flows into the antenna pattern 510, the antenna pattern 510 may form a magnetic field. The plurality of first magnetic sheets 521, 522, 523, 524, 525, 526, and 527 and the plurality of second magnetic sheets 531, 532, 533, 534, 535, 536, and 537 may form a magnetic field around the antenna pattern 510. The magnetic field formed around the antenna pattern 510 may include a first magnetic field pattern 801 that draws a closed curve in the direction of the first surface of the insulation sheet 501 and a second magnetic field pattern 802 that draws a closed curve in the direction of the second surface of the insulation sheet 501.

Figure 9:
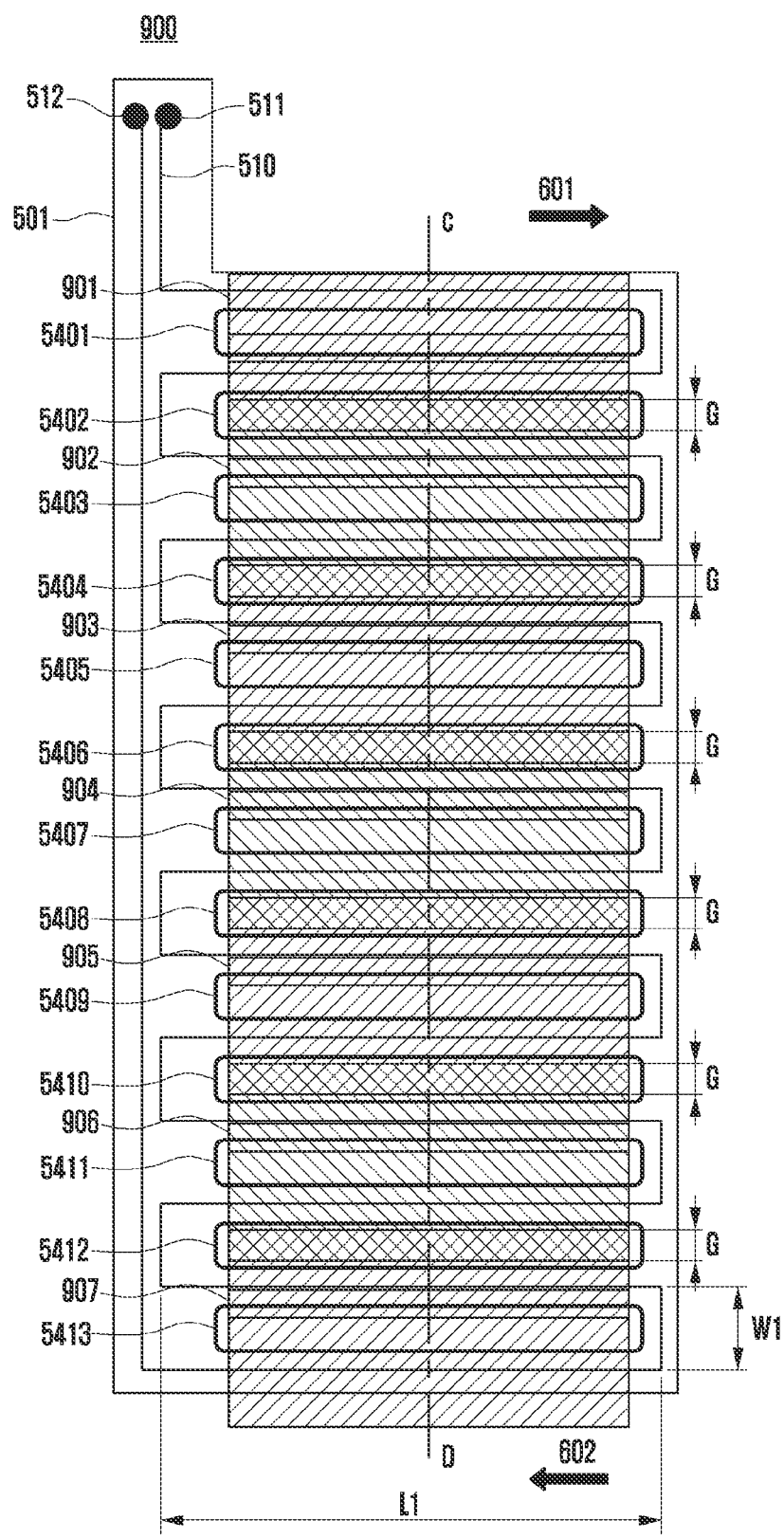
FIG. 9 is a diagram illustrating an antenna according to various embodiments.
Figure 10:
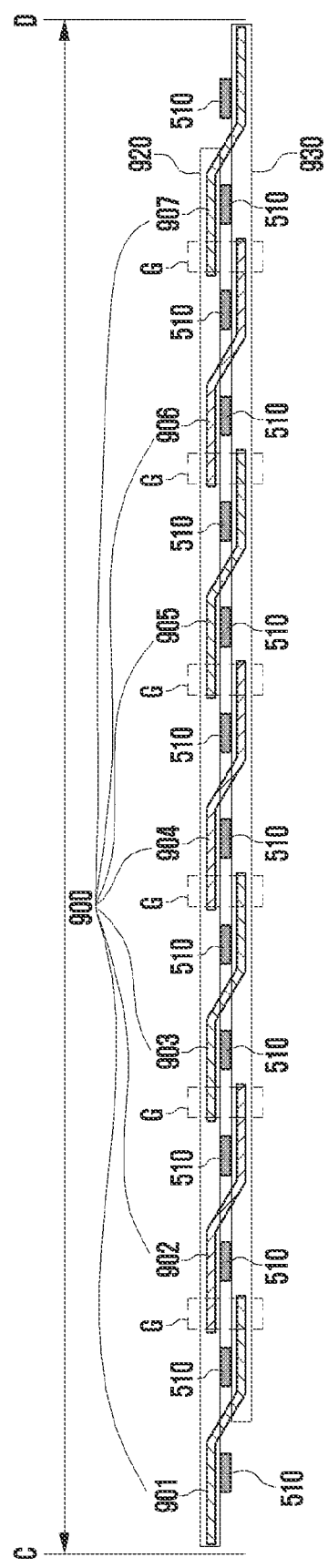
FIG. 10 is a cross-sectional view of the antenna of FIG. 9, which is taken in a direction C-D according to various embodiments.

FIG. 9 is a diagram illustrating an antenna 900 according to various embodiments. FIG. 10 is a cross-sectional view of the antenna 900 in FIG. 9, which is taken in a direction C-D according to various embodiments.

The insulation sheet 501 and antenna pattern 510 of the antenna 900 in FIG. 9 may be the same as or similar to those of the antenna 401 in FIG. 5. A third magnetic sheet layer 920 may be disposed on a first surface of the insulation sheet 501. A fourth magnetic sheet layer 930 may be disposed on a second surface of the insulation sheet 501.

With reference to FIGS. 9 and 10, the antenna 900 may include a plurality of bent magnetic sheets 901, 902, 903, 904, 905, 906, and 907 extended from the third magnetic sheet layer 920 to the fourth magnetic sheet layer 930.

According to an embodiment, each of the plurality of bent magnetic sheets 901, 902, 903, 904, 905, 906, and 907 may be a shape extended from the third magnetic sheet layer 920 to the fourth magnetic sheet layer 930 through the opening part 540.

According to an embodiment, when viewed from the top of the first surface or the second surface, parts of the antenna pattern 510 extended in the first direction 601 may be overlapped with parts of the plurality of bent magnetic sheets 901, 902, 903, 904, 905, 906, and 907 disposed in the third magnetic sheet layer 920. For example, when viewed from the top of the first surface or the second surface, parts of the antenna pattern 510 extended in the first direction 601 may be overlapped with parts of the first bent magnetic sheet 901 disposed in the third magnetic sheet layer 920.

According to an embodiment, when viewed from the top of the first surface or the second surface, parts of the antenna pattern 510 extended in the second direction 602 may be overlapped with parts of the plurality of bent magnetic sheets 901, 902, 903, 904, 905, 906, and 907 disposed in the fourth magnetic sheet layer 930. For example, when viewed from the top of the first surface or the second surface, parts of the antenna pattern 510 extended in the second direction 602 may be overlapped with parts of the first bent magnetic sheet 901 disposed in the fourth magnetic sheet layer 930.

The antenna pattern 510 may include a part extended in the first direction 601 and a part extended in the second direction 602.

According to an embodiment, when viewed from the top of the first surface or the second surface, a part of the antenna pattern 510 that overlaps one of the plurality of bent magnetic sheets 901, 902, 903, 904, 905, 906, and 907 may not be overlapped with another of the plurality of bent magnetic sheets 901, 902, 903, 904, 905, 906, and 907. For example, when viewed from the top of the first surface or the second surface, a part of the antenna pattern 510 overlapped with the first magnetic sheet 901 may not be overlapped with the second magnetic sheet 902.

According to an embodiment, when viewed from the top of the first surface or the second surface, at least parts of the first bent magnetic sheet 901 and the second bent magnetic sheet 902 may be overlapped with each other. Areas of the first bent magnetic sheet 901 and the second bent magnetic sheet 902 may be overlapped with each other by a determined interval G.

According to an embodiment, a section in which the first bent magnetic sheet 901 and the second bent magnetic sheet 902 have been overlapped may correspond to a size of the second opening 5402. Furthermore, for example, the interval G in which the first bent magnetic sheet 901 and the second bent magnetic sheet 902 have been overlapped may be determined based on an isolated distance between a part of the antenna pattern 510 extended in the first direction 601 and a part of the antenna pattern 510, which is adjacent to the part and extended in the second direction 602.

According to an embodiment, at least parts of the second bent magnetic sheet 902 and the third bent magnetic sheet 903 may be overlapped. Areas of the second bent magnetic sheet 902 and the third bent magnetic sheet 903 may be overlapped by the determined interval G.

According to an embodiment, a section in which the second bent magnetic sheet 902 and the third bent magnetic sheet 903 have been overlapped may correspond to a size of the fourth opening 5404.

According to an embodiment, at least parts of the third bent magnetic sheet 903 and the fourth bent magnetic sheet 904 may be overlapped. Areas of the third bent magnetic sheet 903 and the fourth bent magnetic sheet 904 may be overlapped by the determined interval G.

According to an embodiment, a section in which the third bent magnetic sheet 903 and the fourth bent magnetic sheet 904 have been overlapped may correspond to a size of the sixth opening 5406.

In the antenna pattern 510 wound in the first direction 601, at least a part of the fifth bent magnetic sheet 905 may be disposed on the first surface of the insulation sheet 501. In the antenna pattern 510 wound in the second direction 602, at least a part of the fifth bent magnetic sheet 905 may be disposed on the second surface of the insulation sheet 501. At least a part of the fifth bent magnetic sheet 905 may cover the antenna pattern 510 wound in the first direction 601 and at least a part thereof may cover the antenna pattern 510 wound in the second direction 602, on the basis of the ninth opening 5409.

At least parts of the fourth bent magnetic sheet 904 and the fifth bent magnetic sheet 905 may be overlapped. Areas of the fourth bent magnetic sheet 904 and the fifth bent magnetic sheet 905 may be overlapped by the determined interval G.

A section in which the fourth bent magnetic sheet 904 and the fifth bent magnetic sheet 905 have been overlapped may correspond to a size of the eighth opening 5408.

In the antenna pattern 510 wound in the first direction 601, at least a part of the sixth bent magnetic sheet 906 may be disposed on the first surface of the insulation sheet 501. In the antenna pattern 510 wound in the second direction 602, at least a part of the sixth bent magnetic sheet 906 may be disposed on the second surface of the insulation sheet 501. At least a part of the sixth bent magnetic sheet 906 may cover the antenna pattern 510 wound in the first direction 601 and at least a part thereof may cover the antenna pattern 510 wound in the second direction 602, on the basis of the eleventh opening 5411.

At least parts of the fifth bent magnetic sheet 905 and the sixth bent magnetic sheet 906 may be overlapped. Areas of the fifth bent magnetic sheet 905 and the sixth bent magnetic sheet 906 may be overlapped by the determined interval G.

A section in which the fifth bent magnetic sheet 905 and the sixth bent magnetic sheet 906 have been overlapped may correspond to a size of the tenth opening 5410.

In the antenna pattern 510 wound in the first direction 601, at least a part of the seventh bent magnetic sheet 907 may be disposed on the first surface of the insulation sheet 501. In the antenna pattern 510 wound in the second direction 602, at least a part of the seventh bent magnetic sheet 907 may be disposed on the second surface of the insulation sheet 501. At least a part of the seventh bent magnetic sheet 907 may cover the antenna pattern 510 wound in the first direction 601 and at least a part thereof may cover the antenna pattern 510 wound in the second direction 602, on the basis of the thirteenth opening 5413.

At least parts of the sixth bent magnetic sheet 906 and the seventh bent magnetic sheet 907 may be overlapped. Areas of the sixth bent magnetic sheet 906 and the seventh bent magnetic sheet 907 may be overlapped by the determined interval G.

A section in which the sixth bent magnetic sheet 906 and the seventh bent magnetic sheet 907 have been overlapped may correspond to a size of the twelfth opening 5412.

Figure 11:
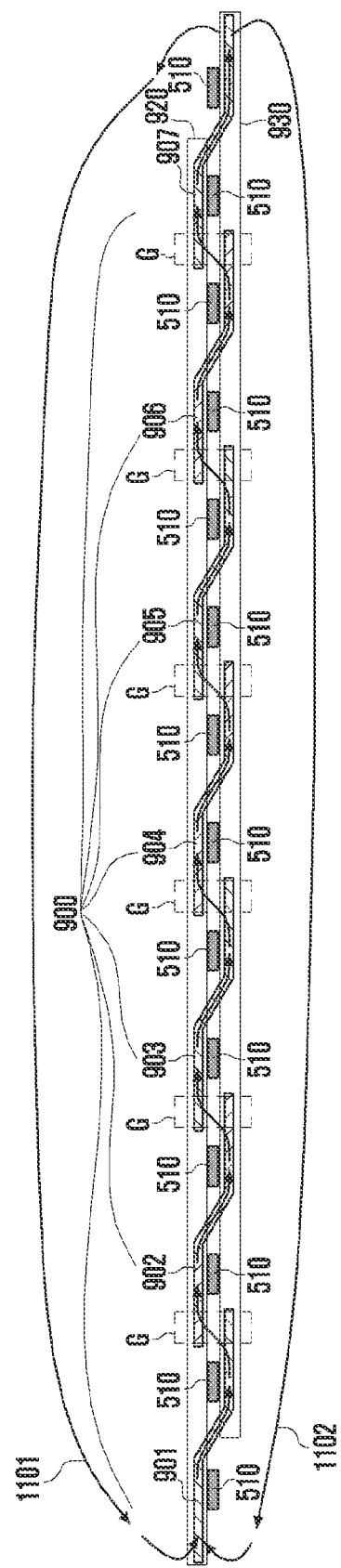
FIG. 11 is a diagram illustrating a magnetic field pattern of the antenna according to various embodiments.

FIG. 11 is a diagram illustrating a magnetic field pattern of the antenna 900 according to various embodiments of the disclosure.

When the antenna pattern 510 is supplied with power from the electronic device 101 and a current flows into the antenna pattern 510, the antenna pattern 510 may form a magnetic field. The plurality of bent magnetic sheets 901, 902, 903, 904, 905, 906, and 907 may form a magnetic field around the antenna pattern 510. The magnetic field formed around the antenna pattern 510 may include a first magnetic field pattern 1101 that draws a closed curve in the direction of the first surface of the insulation sheet 501 and a second magnetic field pattern 1102 that draws a closed curve in the direction of the second surface of the insulation sheet 501.

The electronic device according to various embodiments disclosed in this document may be various types of devices. The electronic device may include a portable communication device (e.g., a smartphone), a computer device, a portable multimedia device, a portable medical device, a camera, a wearable device, home appliances, or the like, for example. The electronic device according to various embodiments of this document is not limited to the aforementioned devices.

Various embodiments of this document and terms used in the embodiments are not intended to limit the technical characteristics, described in this disclosure, to specific embodiments, and should be understood as including various changes, equivalents or alternatives of a corresponding embodiment. In relation to the description of the drawings, similar reference numerals may be used for similar or related elements. A singular form of a noun corresponding to an item may include one item or a plurality of items unless explicitly described otherwise in the context. In this document, each of phrases, such as "A or B", "at least one of A and B", "at least one of A or B", "A, B or C", "at least one of A, B and C", and "at least one of A, B, or C", may include any one of items listed along with a corresponding one of the phrases or all possible combinations of the listed items. Terms, such as a "first", a "second", or "the first" or "the second", may be used to merely distinguish between a corresponding element and another corresponding element, and do not limit corresponding elements in another aspect (e.g., importance or a sequence). If any (e.g., first) element is described as being "coupled" or "connected" to another (e.g., a second) element along with a term "functionally" or "communicatively" or without such a term, the any element may be coupled to the another element directly (e.g., in a wired way), wirelessly, or through a third element.

The term "module" used in various embodiments of this document may include a unit implemented as hardware, software or firmware, or any combination thereof, and may be interchangeably used with a term, such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this document may be implemented as software (e.g., the program 140) including one or more instructions stored in a storage medium (e.g., the embedded memory 136 or the external memory 138) readable by a machine (e.g., the electronic device 101). For example, a processor (e.g., the processor 120) of a machine (e.g., the electronic device 101) may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The machine-readable storage media may be provided in the form of a non-transitory storage medium. Wherein, the "non-transitory" storage medium is a tangible device and may not include a signal (e.g., electromagnetic wave). The term does not distinguish between a case where data is semi-permanently stored in the storage medium and a case where data is temporally stored in the storage medium.

According to an embodiment, the method according to various embodiments disclosed in this document may be included in a computer program product and provided. The computer program product may be traded as a product between a seller and a purchaser. The computer program product may be distributed in the form of a machine-readable storage medium (e.g., a compact disc read only memory (CD-ROM)) or may be distributed through an app store (e.g., PlayStore™) or directly between two user devices (e.g., smartphones) or online (e.g., download or upload). In the case of the online distribution, at least some of the computer program products may be at least temporarily stored or provisionally generated in a machine-readable storage medium, such as the memory of the server of a manufacturer, the server of an app store or a relay server.

According to various embodiments, each (e.g., module or program) of the described elements may include a single entity or a plurality of entities, and some of a plurality of entities may be separately disposed in another element. According to various embodiments, one or more elements or operations of the aforementioned elements may be omitted or one or more other elements or operations may be added. Alternatively or additionally, a plurality of elements (e.g., modules or programs) may be integrated into a single element. In such a case, the integrated element may identically or similarly perform a function performed by a corresponding one of the plurality of elements before at least one function of the plurality of elements is integrated. According to various embodiments, operations performed by a module, a program or another element may be executed sequentially, in parallel, iteratively or heuristically, or one or more of the operations may be executed in different order or may be omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a memory;
   a processor;
   communication circuitry; and
   an antenna,
   wherein the antenna comprises:
   an insulation sheet;
   an antenna pattern disposed in the insulation sheet and having a meander form;
   a first magnetic sheet layer disposed on a first surface of the insulation sheet; and
   a second magnetic sheet layer disposed on a second surface of the insulation sheet,
   wherein each of the first magnetic sheet layer and the second magnetic sheet layer comprises a plurality of magnetic sheets arranged in a layer and disposed at specified intervals each having a first area, and
   the plurality of magnetic sheets of the first magnetic sheet layer are disposed to correspond to the first areas of the second magnetic sheet layer.

2. The electronic device of claim 1, wherein the antenna pattern has a specified length, specified width and specified number of times of bending based on a frequency band.

3. The electronic device of claim 1, wherein the antenna further comprises an opening part corresponding to a specified length and specified width of the antenna pattern in at least a part of the insulation sheet.

4. The electronic device of claim 3, wherein:
   the opening part comprises a plurality of openings, and the plurality of openings form an airgap of the antenna pattern.

5. The electronic device of claim 1, wherein the antenna pattern comprises:
a first meander line extending in a first direction, and
a second meander line extending in a second direction.

6. The electronic device of claim 5, wherein:
the first magnetic sheet layer covers the first meander line, and
the second magnetic sheet layer covers the second meander line.

7. The electronic device of claim 1, wherein:
each of the first magnetic sheet layer and the second magnetic sheet layer comprises the plurality of magnetic sheets, and
the plurality of magnetic sheets overlap in at least some area of the magnetic sheet layers.

8. The electronic device of claim 4, wherein the plurality of magnetic sheets of the first magnetic sheet layer and the plurality of magnetic sheets of second magnetic sheet layer overlap in areas corresponding to the plurality of openings.

9. The electronic device of claim 1, wherein:
the first magnetic sheet layer comprises a plurality of first magnetic sheets, and
the plurality of first magnetic sheets are isolated from each other at specified intervals and connected by connection members comprising a low permeability material at the specified intervals.

10. The electronic device of claim 9, wherein:
the second magnetic sheet layer comprises a plurality of second magnetic sheets, and
the plurality of second magnetic sheets are spaced apart from each other at specified intervals and connected by connection members comprising a low permeability material at the specified intervals.

11. The electronic device of claim 10, wherein the connection member has lower permeability than a permeability of the plurality of first magnetic sheets and the plurality of second magnetic sheets.

12. The electronic device of claim 10, wherein the plurality of first magnetic sheets and the plurality of second magnetic sheets have an identical or a different permeability.

13. An electronic device comprising:
a memory;
a processor;
communication circuitry; and
an antenna,
wherein the antenna comprises:
an insulation sheet comprising an opening part in at least a part thereof, wherein the opening part comprises a plurality of openings;
an antenna pattern disposed on the insulation sheet and having a meander form including a meander line with a specified number of times of bending;
a first magnetic sheet layer disposed on a first surface of the insulation sheet; and
a second magnetic sheet layer disposed on a second surface of the insulation sheet,
wherein the first magnetic sheet layer and the second magnetic sheet layer are connected through the opening part, and wherein the plurality of openings corresponds to the specified number of times of bending in the meander line.

14. The electronic device of claim 13, wherein the antenna pattern has a specified length, a specified width, and the specified number of times of bending based on a frequency band.

15. The electronic device of claim 13, wherein:
the plurality of openings forms an airgap of the antenna pattern.

16. The electronic device of claim 13, wherein the antenna pattern comprises:
a first meander line extending in a first direction, and
a second meander line extending in a second direction.

17. The electronic device of claim 16, wherein:
each of the first magnetic sheet layer and the second magnetic sheet layer comprises a plurality of bent magnetic sheets,
at least a part of each of the plurality of bent magnetic sheets covers the first meander line, and
at least a part of each of the plurality of bent magnetic sheets covers the second meander line.

18. The electronic device of claim 17, wherein each of the plurality of bent magnetic sheets comprises a magnetic sheet bent through each of the plurality of openings.

19. The electronic device of claim 13, wherein the first magnetic sheet layer and the second magnetic sheet layer have an identical or a different permeability.

20. The electronic device of claim 17, wherein the plurality of bent magnetic sheets overlap in areas corresponding to the plurality of openings.

* * * * *